United States Patent
Cooper et al.

(10) Patent No.: US 8,284,828 B2
(45) Date of Patent: Oct. 9, 2012

(54) MONITORING INSTABILITY AND RESETTING AN EQUALIZER

(75) Inventors: Michael J. Cooper, Marietta, GA (US); John L. Moran, Uxbrige, MA (US)

(73) Assignee: General Instrument Corporation, Horsham, PA (US)

(*) Notice: Subject to any disclaimer, the term of this patent is extended or adjusted under 35 U.S.C. 154(b) by 390 days.

(21) Appl. No.: 12/616,337

(22) Filed: Nov. 11, 2009

(65) Prior Publication Data

US 2011/0110415 A1    May 12, 2011

(51) Int. Cl.
*H03H 7/30* (2006.01)
*H03H 7/40* (2006.01)
*H03K 5/159* (2006.01)

(52) U.S. Cl. ........ 375/232; 375/231; 375/233; 375/234; 375/346; 375/350; 708/322; 708/323

(58) Field of Classification Search .......... 375/230–235, 375/346, 350; 708/322, 323
See application file for complete search history.

(56) References Cited

U.S. PATENT DOCUMENTS

| | | | | |
|---|---|---|---|---|
| 4,811,360 A * | 3/1989 | Potter | .......... | 375/231 |
| 5,228,060 A * | 7/1993 | Uchiyama | .......... | 375/316 |
| 6,445,734 B1 | 9/2002 | Chen et al. | | |
| 7,263,123 B2 * | 8/2007 | Yousef | .......... | 375/233 |
| 2005/0175080 A1 * | 8/2005 | Bouillett | .......... | 375/229 |
| 2007/0133672 A1 | 6/2007 | Lee et al. | | |
| 2007/0147489 A1 | 6/2007 | Sun et al. | | |

FOREIGN PATENT DOCUMENTS

EP    1235402 A2    8/2002

OTHER PUBLICATIONS

PCT Search Report & Written Opinion, Re: Application #PCT/US2010/053738; Mar. 29, 2011.

Fang Zhao, et al, "Techniques for minimizing error propagation in decision feedback detectors for recording channels", IEEE Transactions on Magnetics, vol. 31, No. 1, Jan. 1, 2001.

* cited by examiner

*Primary Examiner* — Phuong Phu
(74) *Attorney, Agent, or Firm* — Stewart M. Wiener

(57) ABSTRACT

Instability resulting from non-linear impairments is detected and an equalizer of an end device is reset. An equalization instability threshold is retrieved from a data storage device. An equalization parameter for the end device is monitored and, if the equalization parameter exceeds the equalization instability threshold, the equalizer is reset.

18 Claims, 5 Drawing Sheets

MONITORING INSTABILITY AND RESETTING AN EQUALIZER

BACKGROUND

Cable television networks, including community antenna television (CATV), hybrid fiber-coaxial (HFC), and fiber networks, have been in widespread use for many years and are extensive. The extensive and complex cable networks are often difficult for a cable operator to manage and monitor. A typical cable network generally contains a headend, which is usually connected to several nodes that provide bi-directional content to a cable modem termination system (CMTS). In many instances, several nodes may serve a particular area of a town or city and several customer premises are connected to each of the nodes. The CMTS contains several receivers, and each receiver connects to modems of many of the customers. For instance, a single receiver may be connected to hundreds of modems at customer premises. Data may be transmitted downstream to the modems on different frequency bands. The modems communicate to the CMTS via upstream communications on a dedicated frequency band, referred to as a return band.

Cable networks are also increasingly carrying signals, which require a high quality and reliability of service, such as Voice over IP (VoIP) communications, streaming video, etc. Any disruption of voice or data traffic is a great inconvenience and often unacceptable to a customer for these type of services. Various factors may affect the quality of service, including the quality of the upstream channels. One factor that affects the quality of upstream communications is the presence of linear distortion impairments, such as microreflections (MRs) of communication signals, group delay variation (GDV), and amplitude distortion (AD).

These linear distortion impairments are known to be mitigated by the fundamental digital communications receiver function of equalization. During equalization, an equalizer generates coefficient information that is used to create a digital filter, with an inverse channel response, canceling distortion in the channel caused by the linear distortion impairments. The equalization coefficients in Data Over Cable Service Interface Specification (DOCSIS) 2.0 and DOCSIS 3.0 are 24 symbol-spaced coefficients (also referred to as equalizer taps). Equalization is part of virtually all modern telecommunications platforms, and is instrumental in proper upstream communications for all DOCSIS systems.

However, achieving equalization within the context of other network impairments such as Gaussian noise, ingress and impulse noise, signal clipping, etc. is not trivial. These non-linear impairments impede the ability of the equalizer to measure linear distortion and derive the equalizing filter. As a result, the equalizer may become unstable which is typically manifested by a general rise of all equalization coefficients. When this happens, data communications are seriously impaired or may be lost completely.

Since each cable modem is located at a unique point within the network, the equalizing filter required for each modem is unique. For instance, a given MR may affect some modems while having no effect on other modems. In environments where moderate to significant noise is present the equalizing filters manifest problems of instability. Possible sources of noise include narrow ingress such as common path distortion (CPD), and wideband impulse noise. When significant noise exists on the upstream channel that the equalizer is not able to resolve, the equalizer derives equalizing filter updates for each cable modem, which not only reflect the linear distortion impairments, for example the MR, but also random, possibly non-linear, volatile noise. As these equalizing filter updates are made and sent to the cable modems, generally all of the secondary equalizer taps of the equalizer slowly climb in power until ultimately, the equalizing filter distorts modem transmission so much that communications are no longer supported with the CMTS.

Further, as is often the case when the equalizer is used, data is sent using higher modulations (16 quadrature amplitude modulation (QAM), 32 QAM, 64 QAM) while station maintenance (which is required by DOCSIS to maintain connectivity with the modem) uses a lower modulation quadrature phase shift keying (QPSK). The robustness of QPSK sometimes allows the modems to remain connected or registered while no longer being able to pass upstream data. Similarly, sometimes the modems will completely deregister and have to reregister before data communications may continue. Both cases result in significant impacts to an end user as data communications are impeded for a significant period.

SUMMARY

According to an embodiment, a communications device detects instability resulting from non-linear impairments and resets at least one equalizer of an end device. The communications device includes a data storage device configured to store an equalization instability threshold. The communications device also includes a processor configured to monitor an equalization parameter for the equalizer of the end device. The processor also determines whether the equalization parameter exceeds the equalization instability threshold, and, if the equalization parameter exceeds the equalization instability threshold, resets the equalizer.

A method for detecting instability resulting from non-linear impairments and resetting at least one equalizer of an end device is disclosed, according to an embodiment. In the method, an equalization instability threshold is retrieved from a data storage device. An equalization parameter for the end device is monitored and if the equalization parameter exceeds the equalization instability threshold, the equalizer is reset.

Still further disclosed is a computer readable storage medium on which is embedded one or more computer programs implementing the above-disclosed method for detecting instability resulting from non-linear impairments and resetting at least one equalizer of an end device, according to an embodiment.

Embodiments of the invention provide a mechanism that detects when an equalizer of an end device has become unstable and clears, or resets, the equalizer so that user data passing may continue with minimal impact. Further, embodiments of this invention provide an approach to leverage a minor frequency change to achieve a reset of the equalizer. Because instability may lead to errors and dropped service, by resetting the equalizer and preventing the instability, the embodiments provide a return to better operation in a timely fashion.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the present invention is described by referring mainly to exemplary embodiments thereof. In the following description, numerous specific details are set forth to provide a thorough understanding of the present invention. However, it will be apparent to one of ordinary skill in the art that the present invention may be practiced without limitation to these specific details. In other instances, well known methods and structures have not been described in detail to avoid unnecessarily obscuring the present invention.

Figure 1:
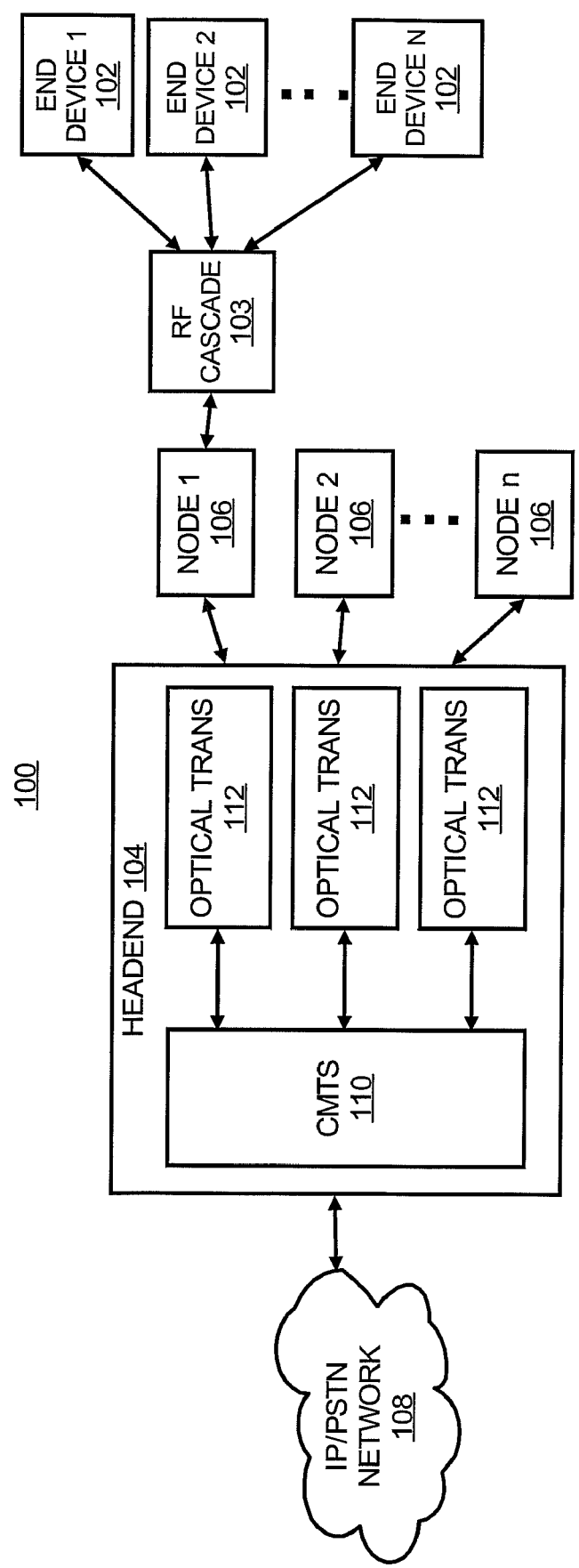
FIG. 1 illustrates a block diagram of a cable network, according to an embodiment of the invention.

FIG. 1 illustrates a network 100, such as an HFC network, including end devices 102. Although the HFC network is shown, the embodiments may be used in any network to mitigate non-linear distortion in a communication channel. The end devices 102 may be Data Over Cable Service Interface Specification (DOCSIS) Terminal devices, such as cable modems (CMs), modem terminal adapters, MTAs, and embedded cable modems of DOCSIS set-top gateways (eCMs of DSGs), or any other like devices. The end devices 102 are connected to a headend 104 of the network 100 via nodes 106 and an RF cascade 103 comprised of multiple amplifiers and passive devices including cabling, taps, splitters, and in-line equalizers. The headend 104 connects to an IP (Internet Protocol) and/or PSTN (Public Switched Telephone Network) network 108. Data, such as TV programs, audio, video and other data, which may be from the network 108, is sent from the headend 104 to the end devices 102. In addition, the end devices 102 may send data upstream towards the headend 104. Although not shown, each of the nodes 106 may be connected to multiple end devices.

As illustrated in FIG. 1, the headend 104 includes a CMTS 110 and optical transceivers 112 which provide optical communications to and from the CMTS 110 through optical fiber to the nodes 106. Typically, the nodes 106 connect to the headend 104, and the headend 104 contains a plurality of CMTS units 110. Each CMTS 110 contains a plurality of transceivers, which communicate with the plurality of end devices 102. For example, each CMTS 110 may have eight or more receivers (e.g., for DOCSIS 2.0), and each receiver may communicate with hundreds of end devices 102. The CMTS may have more than eight receivers (e.g., DOCSIS 3.0 may use 48 receivers).

Figure 2:
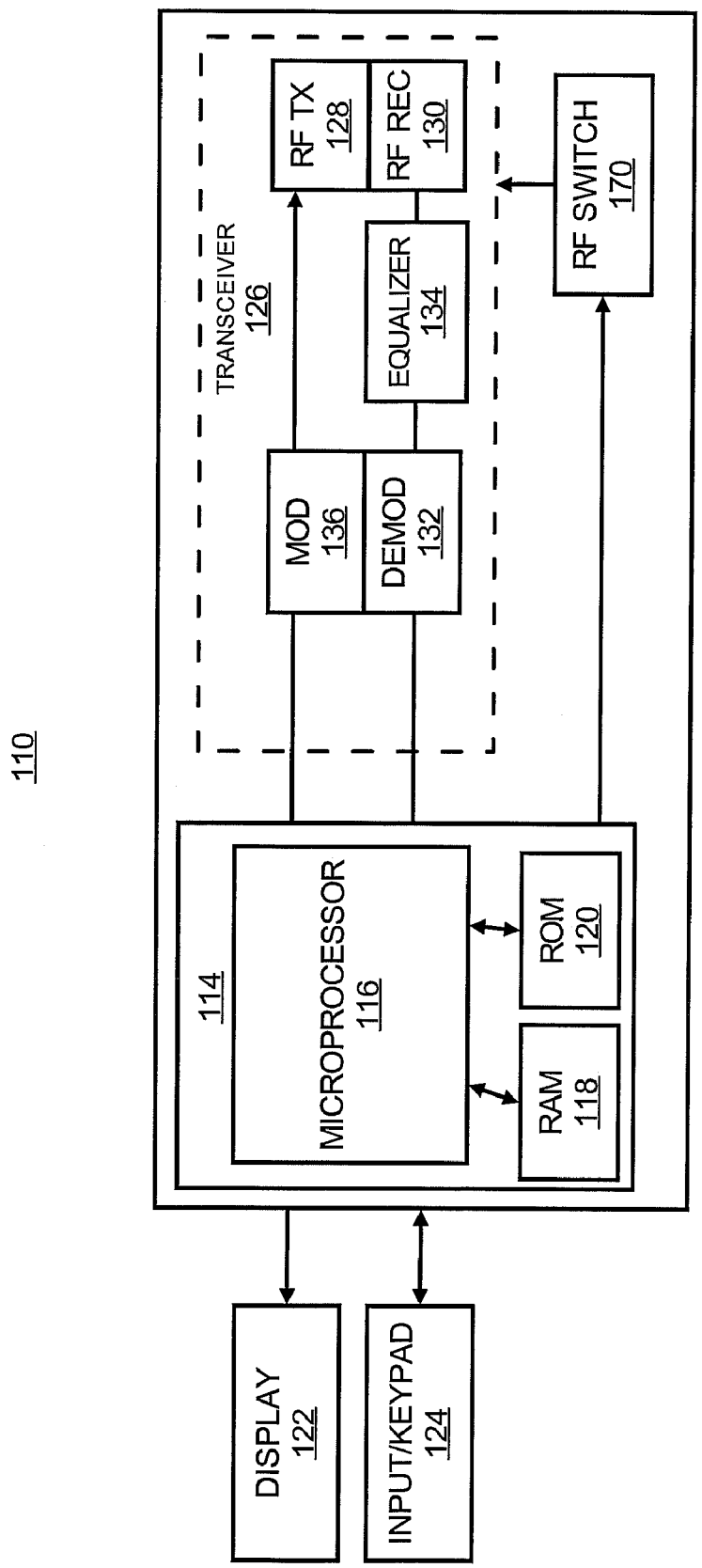
FIG. 2 illustrates a CMTS architecture, according to an embodiment of the invention.

FIG. 2 illustrates an architecture of the CMTS 110, according to an embodiment. As illustrated, the CMTS 110 includes a processor 114 having a microprocessor 116 that receives information, such as instructions and data, from a RAM 118 and a ROM 120. The processor 114 controls the operation of the CMTS 110 and RF communication signals to be sent by the end devices 102 to the CMTS 110. The processor 114 is connected to a display 122, which may display status information such as whether station maintenance (SM) is being performed, or a receiver is in need of load balancing. An input keypad 124 may also be connected to the processor 114 to permit an operator to provide instructions and process requests.

The CMTS 110 also includes an RF transceiver (transmitter/receiver) unit 126 having transmitters 128 and receivers 130 providing bi-directional communication capability with the end devices 102 through optical transceivers 112, nodes 106 and an RF cascade 103 comprised of multiple amplifiers and passive devices including cabling, network taps, splitters, and in-line equalizers. The CMTS 110 may contain a plurality of RF receivers 130, such as eight RF receivers and a spare RF receiver. Each of the RF receivers 130 may provide support for a hundred or more end devices 102.

By way of example, the receivers 130 can be BROADCOM 3140 receivers that each includes a demodulator unit 132 and an equalizer 134 to which received RF signals are provided, for instance, for purposes of acquiring equalizer values and burst modulation error ratio (MER) measurements, packet error rate (PER) and bit error rate (BER). The equalizer 134 may be a multiple tap linear equalizer (e.g. a twenty-four tap linear equalizer), which also is known as a feed forward equalizer (FFE). The equalizer 134 may be integrally contained in the RF receiver, or alternatively, may be provided as a separate device. The communication characteristics of each receiver 130 may be stored on ROM 120 or RAM 118, or may be provided from an external source. Note that the equalizer 134 is in the upstream path, for example, from the end devices 102 towards the network 108.

The RF transceiver unit 126 also includes a modulator 136, which provides the modulated signals to RF transmitters 128. The modulator 136 and demodulator 132 are capable of modulation schemes of various levels of complexity. For example, some upstream DOCSIS 2.0 modulation schemes that may be used in order of level of complexity include, but are not limited to 16 QAM, 32 QAM, 64 QAM and 128 QAM. The microprocessor 116 may provide instructions to the end devices 102 as to which modulation scheme is to be used during communication.

The CMTS 110 performs a pre-equalization (PRE-EQ) procedure to compensate for upstream channel impairments. The PRE-EQ procedure is used to mitigate linear distortions such as micro-reflections (MRs) of communication signals, group delay variation (GDV), and amplitude distortion (AD) for upstream channels for the end devices 102. The CMTS 110 receives an incoming signal from each of the end devices 102 and compares the incoming signal with an expected signal, which is an ideal response. The expected signal may be a test signal or reference signal used by the CMTS 110 to determine whether the transmission is affected by linear distortions. If the incoming signal received by the CMTS 110 differs from the expected signal, the microprocessor 116 or other processing device performing a PRE-EQ procedure then determines a set of equalization coefficients for each of the end devices 102. The equalization coefficients represent coefficients for a digital filter that counters the upstream channel impairments introduced by a communications channel, for instance in an HFC network, on a transmitted signal sent by the end device 102. The communications channel distorts the transmitted signal from the end device 102 in a specific way and the equalization implemented by the digital filter has the effect of exactly countering that distortion such that the received signal represents an ideal signal sent from the end device 102 to the CMTS 110 without effect of the distortion. The CMTS 110 then instructs the end devices 102 to set their transmit equalization coefficients to the equalization coefficients determined by the PRE-EQ procedure. Each end device 102 applies the equalization coefficients and then continues to transmit. Each end device 102 potentially, receives a different set of equalization coefficients, because the equalization coefficients are generated for each upstream channel. Since each end device 102 is connected to a different physical location within the HFC network, the equalization coefficients are generally unique to each end device 102. The CMTS 110 thereafter continues to monitor and compare the incoming signal against the expected signal.

According to an embodiment, the CMTS 110 is also configured to detect instability resulting from non-linear impairments and to reset an equalizer for an end device. The CMTS 110 monitors an equalization parameter (e.g., equalizing filter in each end device or equalizing filter update) for each of the plurality of end devices 102 and determines whether the equalization parameter for each end device exceeds the equalization instability threshold. In response to an equalization parameter exceeding the equalization instability threshold, the CMTS 110 is configured to reset the corresponding equalizer as will be described with respect to FIG. 4 and the method 200 hereinbelow.

Figure 3:
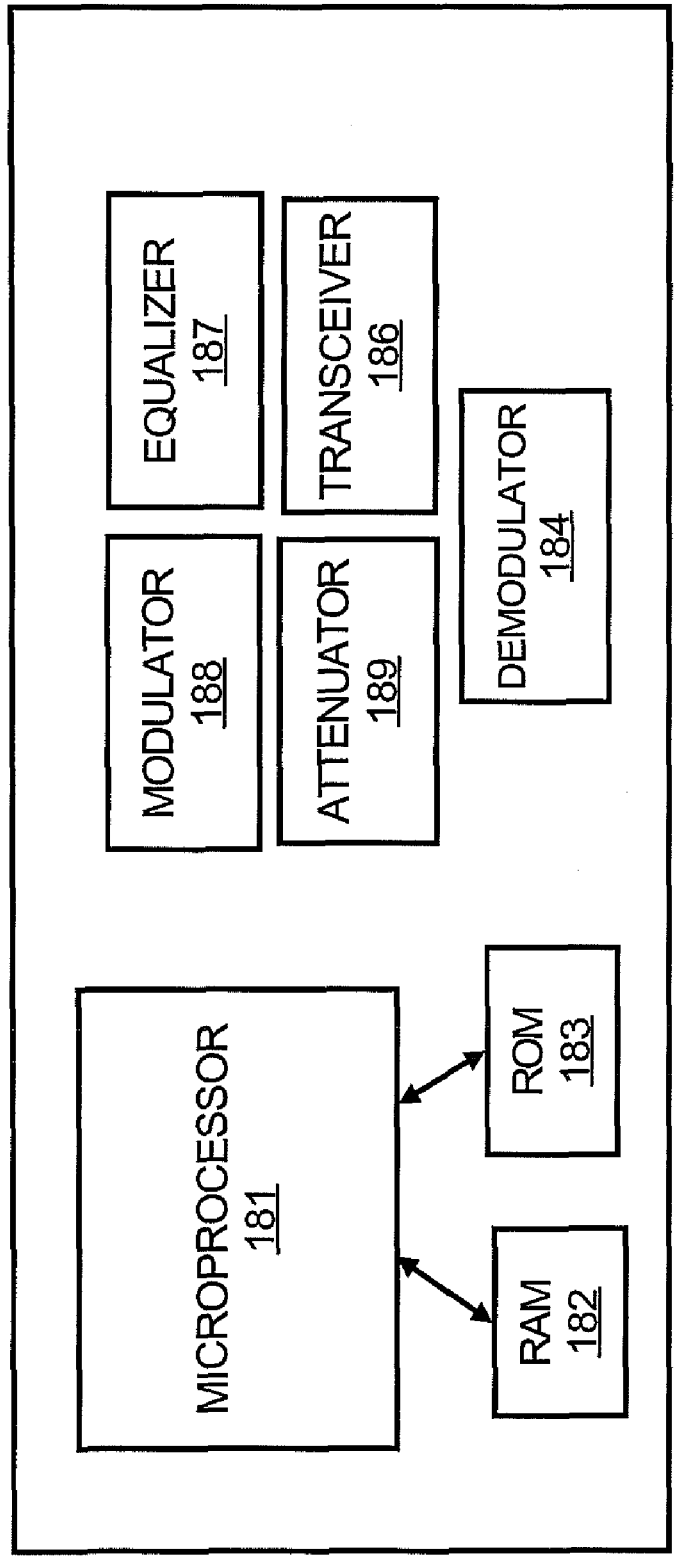
FIG. 3 illustrates an end device, according to an embodiment of the invention.

FIG. 3 illustrates an embodiment of one of the end devices 102 (shown as 102a), where the end device is a cable modem. The end device 102a contains a processor 181 which communicates with a RAM 182 and ROM 183 and which controls the general operation of the end device 102, including applying the equalization coefficients and controlling preamble lengths of communications sent by the end device 102a in accordance with instructions from the CMTS 110.

The end device 102a also contains a transceiver 186 which provides bidirectional RF communication with the CMTS 110. A demodulator 184 demodulates signals received by the transceiver 186, and the equalizer 187 biases communications transmitted to the CMTS 110. For example, the equalizer 187 is connected in the upstream path between a transmitter in the transceiver 186 and the CMTS 110. The microprocessor 181 configures the equalizer 187 using the equalization coefficients received from the CMTS 110 to compensate for upstream impairments. The equalization coefficients are received by the end device 102a in an equalizing filter update and used to form an equalizing filter.

The end device 102a also contains a modulator 188, which modulates signals to be transmitted upstream to the CMTS 110 according to a modulation scheme, which the end device 102a has been instructed to use by the CMTS 110. In addition, the end device 102a has an attenuator 189 controlled by microprocessor 181 to attenuate signals to be transmitted by the RF transmitter to be within a desired power level. Those of skill in the art will appreciate that the components of end device 102a have been illustrated separately only for discussion purposes and that various components may be combined in practice.

By way of example, the end device 102a may be a DOCSIS network element, such as a cable modem, to generate a variety of signals. Accordingly, the test signals may be implemented using one of the available upstream DOCSIS bandwidths, e.g. 200 kHz, 400 kHz, 800 kHz, 1600 kHz, 3200 kHz or 6400 kHz.

It will be apparent that the system 100 may include additional elements not shown and that some of the elements described herein may be removed, substituted and/or modified without departing from the scope of the system 100. It should also be apparent that one or more of the elements described in the embodiment of FIG. 1 may be optional.

An example of a methods in which the system 100 may be employed for detecting instability and resetting an equalizer of an end device will now be described with respect to the following flow diagram of the methods 200 and 210 depicted in FIGS. 4 and 5. It should be apparent to those of ordinary skill in the art that the methods 200, 210 represent generalized illustrations and that other steps may be added or existing steps may be removed, modified or rearranged without departing from the scopes of the methods 200, 210. In addition, the methods 200, 210 are described with respect to the system 100 by way of example and not limitation, and the methods 200, 210 may be used in other systems. The methods and functions described herein may be performed by communication devices other than the CMTS 110 or end devices 102 described herein.

Some or all of the operations set forth in the methods 200, 210 may be contained as one or more computer programs stored in any desired computer readable medium and executed by a processor on a computer system. Exemplary computer readable media that may be used to store software operable to implement the present invention include but are not limited to conventional computer system RAM, ROM, EPROM, EEPROM, hard disks, or other data storage devices.

Figure 4:
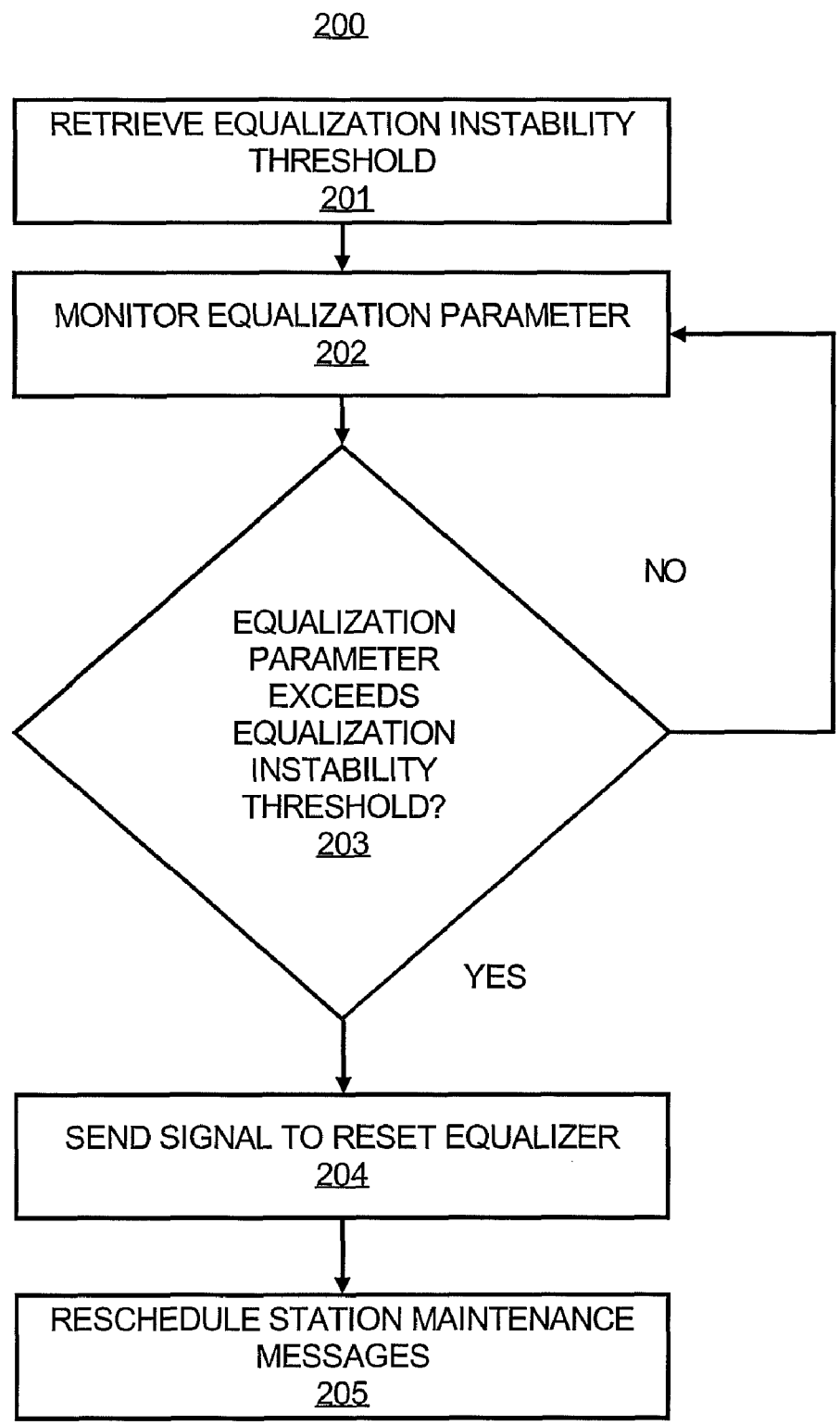
FIG. 4 illustrates a method for detecting instability resulting from non-linear impairments and resetting at least one equalizer, according to an embodiment of the invention.

The method 200, as shown in FIG. 4, is a generalized illustration of a method of detecting instability resulting from non-linear impairments and resetting an equalizer of an end device.

At step 201, as shown in FIG. 4, the CMTS 110 retrieves an equalization instability threshold corresponding to an equalization parameter from a data storage (not shown) of the CMTS 110. The equalization parameter may be an equalizing filter or an equalizing filter update (e.g., the equalization coefficients for the filter or update) sent to one of the plurality of end devices 102, for instance, the end device 102a. The end device 102a may comprise a cable modem or other DOCSIS network element or other network element configured with an equalizer 187. The equalizer 187 of the end device 102a uses the equalization parameter to perform a PRE-EQ procedure on a signal prior to transmission.

The equalizing filter is a digital filter within the CMTS 110 in which complex values of the equalization coefficients are used to determine the characteristics of the equalizing filter corresponding to each of the end devices 102. In the instance of the end device 102a, the equalization coefficients of the equalizer filter adapt to result in a filter with phase and magnitude characteristics inversely matching the distortion introduced by the communications channel connecting the end device 102a and the CMTS 110. The resulting equalization coefficients are sent to the end device 102a from the CMTS 110 with an additional indication of whether these equalization coefficients are an equalizing filter update or a new equalizing filter.

Typically, the equalization coefficients are sent as an equalizing filter update meaning that the end device 102a is required to adjust its internal equalizer 187 by convolving the equalization coefficients with its internal transmit equalizer 187 yielding a new internal equalizer 187. If the equalization coefficients sent to the end device 102a from the CMTS 110 are a new equalizing filter, then the end device 102a will completely reload its internal equalizer 187, thus discarding its previous equalization coefficients. This new load process provides an easy way to reset the equalizer 187 by setting all equalization coefficients to zero except a real coefficient of a primary tap which is set to 1

By way of example, the equalization filter update as received by the end device 102a from the CMTS 110 is then used for equalization, as is now described. During equalization, the equalizer 187 for the end device 102a stores the received equalizing filter update, and uses the equalizing filter update to create the equalizing filter. For example, coefficients in the equalizing filter update are convolved with the existing equalizing filter of the end device 102a. The new equalizing filter is applied by the equalizer 187 to provide an inverse channel response to cancel linear distortion in the upstream channel caused by linear distortion impairments previously identified by the CMTS 110 in the PRE-EQ procedure. To apply the new equalizing filter, the equalizer 187 multiplies successive samples of an incoming data signal by respective equalization coefficients of the new equalizing filter. The incoming data signal may include information to be transmitted to another end device, such as VoIP data, digital media, or other types of data. An equalized signal is generated by adding the resulting products of the multiplication of the successive samples by the equalization coefficients and transmitted to another device via the CMTS 110 and other networks such as the Internet.

The CMTS 110 receives the equalized signal from the end device 102*a*. The CMTS 110 then forms an error signal equal to the difference between the equalized signal and a reference signal, which is described above with respect to the PRE-EQ procedure. The error signal is a new equalizing filter update that may be used to update the equalization coefficients in the equalizing filter 187 in the end device 102*a* to minimize distortion caused by linear channel impairments. This process is repeated.

In order to mitigate non-linear distortion, the CMTS 110 determines when the equalization filter used by the end device 102*a* goes out of predetermined tolerances. For example, as described above in step 201, the CMTS 110 retrieves an equalization instability threshold corresponding to an equalization parameter from a data storage (not shown) of the CMTS 110. The equalization parameter may be the equalizing filter used by an end device or an equalizing filter update sent to an end device.

The equalization instability threshold is a predetermined limit above which the equalizer 187 (e.g., the equalizer filter applied by the equalizer 187) becomes unstable due to non-linear impairments. The equalization instability threshold may be determined through field-testing of the equalizer 187. In one example, the equalization instability threshold is a maximum power threshold for total power in all secondary equalizer taps and the equalization parameter is a sum of the total power in all secondary equalizer taps. The secondary equalizer taps comprise all tap coefficients excluding a tap coefficient from a main (or center) equalizer tap. If the sum of the total power in all secondary equalizer taps exceeds the maximum power threshold for the total power in all secondary equalizer taps, then the equalizer 187 has become unstable. According to another embodiment, the equalization instability threshold is a predetermined percentage of the secondary equalizer taps exceeding a maximum power threshold. The equalization parameter in this instance is the power in all the secondary equalizer taps measured individually against the maximum power threshold. If the predetermined percentage of the secondary equalizer taps exceeds the maximum power threshold, then the equalizer 187 has become unstable.

At step 202, the CMTS 110 monitors the equalization parameter in order to detect instability of the equalizer 187. According to an embodiment, the CMTS 110 may monitor the equalizing filter by retrieving the equalizer coefficients from the equalizer 187 in the end device 102*a*. The DOCSIS communication standard would allow for this by retrieving the equalization coefficients via Simple Network Management Protocol (SNMP). According to another embodiment, the CMTS 110 monitors the equalizing filter updates sent to the end device 102*a*. The CMTS 110 may monitor the equalizing filter updates by determining the equalizing filter updates.

At step 203, the CMTS 110 determines whether the equalization parameter exceeds the equalization instability threshold. For instance, if the equalization instability threshold is the maximum power threshold for total power in all secondary equalizer taps, the equalization parameter exceeds the equalization instability threshold when the sum of the total power in all secondary equalizer taps is greater than the maximum power threshold for total power in all secondary equalizer taps. In other instances, exceeding the equalization instability threshold may be a parameter that falls below the equalization instability threshold.

At step 204, if the CMTS 110 determines that the equalization parameter exceeds the equalization instability threshold, the CMTS 110 sends a signal to the end device 102*a* to reset the equalizer 187. The CMTS 110 may determine to send the signal to a particular end device or to all of the end devices 102 as described hereinbelow with respect to the method 210 and FIG. 5.

According to an embodiment, the signal comprises a predetermined frequency change, for instance a 1-Hertz frequency change. The frequency difference is required to be a relatively small value that equates to the same channel and the same frequency band. The predetermined frequency change effectively resets the equalizer for all the end devices 102 on that channel. For instance, the DOCSIS specification requires that all cable modems RESET their equalizer whenever a frequency change is commanded, even for a frequency change of only 1-Hertz, a minor change received by a burst receiver in the CMTS 110. A 1-Hertz frequency change is within the tracking accuracy of many conventional burst receivers. Alternately, the frequency change may be to a different frequency band. According to another embodiment, the signal is a DOCSIS equalizer load command to initial values in which all the equalization coefficients are set to zero except the real coefficient of the primary tap which is set to 1. The DOCSIS equalizer load command is implemented in a range response (RNG-RSP) media access control (MAC) message sent from the CMTS 110 to the end device 102*a* during a DOCSIS ranging (or station maintenance) process.

At step 205, the CMTS 110 may be configured to reschedule station maintenance messages so that the end device 102*a* is updated immediately, thus minimizing or eliminating lost packets. From an overall view of the system 100, a tradeoff of the benefit of resetting the equalizer 187 should be balanced against a period, for instance several seconds, until a station maintenance (periodic ranging) message is used to update the equalizer 187 of the end device 102*a*. During the period, a receiver of the CMTS 110 is required to fully compensate for distortion in the channel or delay transmission by the end device 102*a*. By rescheduling the station maintenance messages, the CMTS 110 minimizes an impact of this requirement on the receiver of the CMTS 110.

Figure 5:
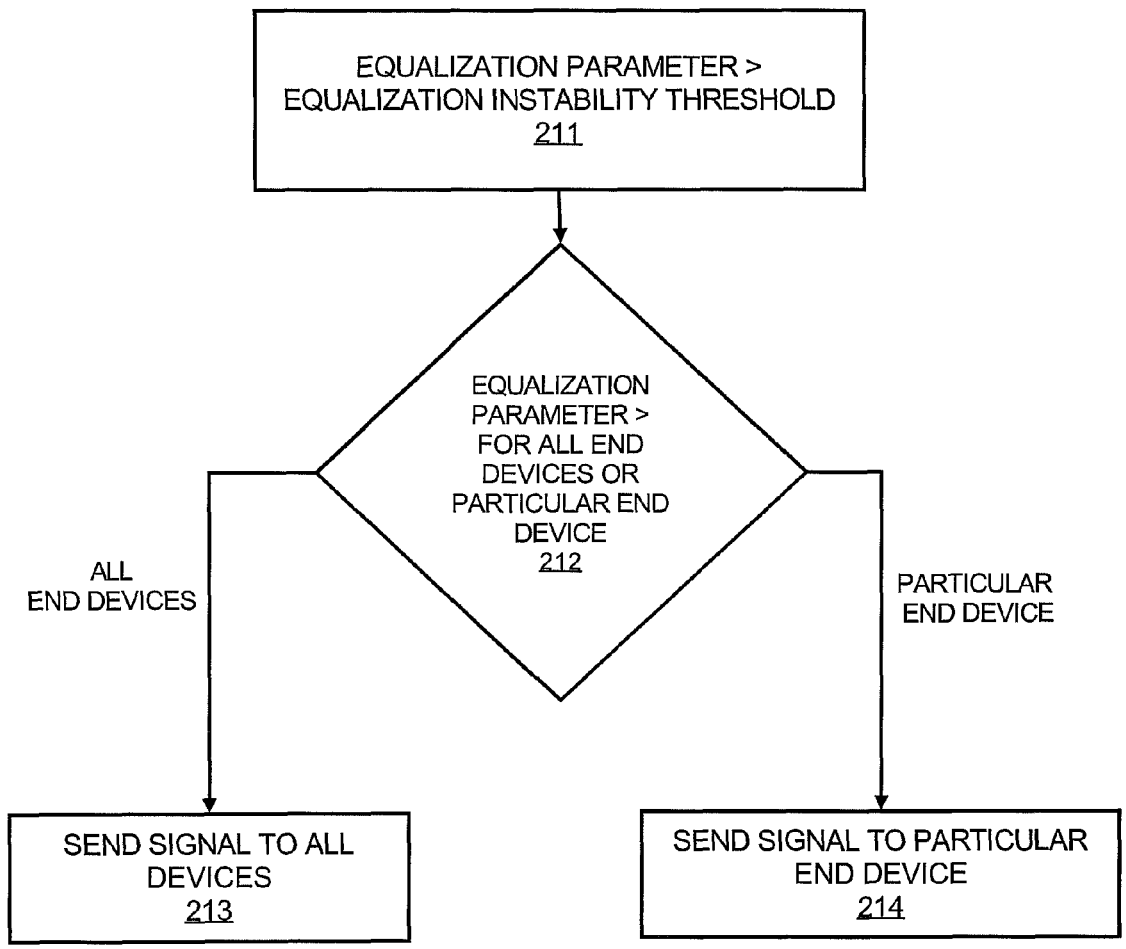
FIG. 5 illustrates a method for detecting instability resulting from non-linear impairments and resetting at least one equalizer, according to an embodiment of the invention.

The method 210, as shown in FIG. 5, is a generalized illustration of a method of determining where to direct a signal to reset an equalizer(s) if the equalization parameter exceeds the equalization instability threshold for all the end devices 102 or a particular end device. The method 210 may be substeps performed for the steps 204-205 of the method 200.

At step 211, the CMTS 110 determines that the equalization parameter is greater than the equalization instability threshold. Thereafter, at step 212, the CMTS 110 determines whether the equalization parameter is greater than the equalization instability threshold for all of the end devices 102 or for a particular end device. The CMTS 110 may determine instability for a particular end device as the equalization coefficients are unique to each of the end devices 102.

At step 213, in response to a determination that the equalization parameter is greater than the equalization instability threshold for all of the end devices 102, the CMTS 110 sends the signal to all of the end devices 102, resetting all the end devices 102. The method of performing a frequency change, for example, a small upstream of 1 Hz described above at step 204 of the method 200, is a simple and highly efficient method for resetting all DOCSIS end devices connected to the CMTS 110. Alternatively, the CMTS 110 may send separate signals to all of the end devices 102 in the form of separate DOCSIS equalizer load commands.

At step 214, in response to a determination that the equalization parameter is greater than the equalization instability threshold for a particular end device, the CMTS 110 selectively sends the signal to the particular end device that has become unstable. Selectively resetting a particular end device may be accomplished by sending a DOCSIS equalizer load command in the subsequent RNG-RSP MAC message sent to the device. The load command message will include the initial values which are to be loaded to the particular end device's equalizer, namely all equalization coefficients are set to zero except the real coefficient of the primary tap which is set to 1.

Alternatively, the CMTS 110 may be connected to each of the end devices 102 with a secondary channel having an upstream channel descriptor (UCD). The only difference between the secondary channel and the primary channel is frequency. In this instance, a modulation profile and a minislot assignment mapping are required to match identically for the primary channel and the secondary channel. The reset is achieved by adding or subtracting the frequency change from the RF center frequency in the DOCSIS UCD message for the channel. The CMTS 110 may thereafter direct the particular end device, for instance the end device 102a, that has become unstable to change to the secondary channel, thus resetting the equalizer 187. All modems requiring reset may be directed to the secondary channel.

The CMTS 110 thereafter redirects the end devices 102 back to the primary channel, thus clearing the equalizers. Both the primary channel and the secondary channel share a same frequency band and are only slightly offset in frequency, such as 1 Hz. As a result, while the two channels are active with the end devices 102, the CMTS 110 is utilizing only one receiver to capture the upstream bursts. The CMTS 110 manages the mapping such that the primary channel contains all the modem transmissions for both the primary channel and the secondary channel. This allows the receiver of the CMTS 110 to be programmed correctly to receive the upstream bursts. While the end device 102 is transmitting on the secondary channel, the wide acquisition band of the receiver allows it to receive that burst and the CMTS 110 sees the burst as a burst on the primary channel.

The CMTS 110 may be configured to use a combination of selective resetting of the equalizer of a particular end device and resetting all the end devices 102. In cases where many equalizers on a channel have become unstable, all may be quickly reset and returned to a good operating state using the primary channel. Selective resetting may be used if few equalizers are affected.

A computing apparatus (not shown) may be configured to implement or execute one or more of the processes required to detect instability and reset the equalizer 187 of the end device 102a depicted in FIGS. 4-5, according to an embodiment. The computing apparatus may include a processor that may implement or execute some or all of the steps described in the method depicted in FIGS. 4-5. Commands and data from the processor may be communicated over a communication bus. The computing apparatus may also include a main memory, such as a random access memory (RAM), where the program code for the processor, may be executed during runtime, and a secondary memory. The secondary memory includes, for example, one or more hard disk drives and/or a removable storage drive, representing a floppy diskette drive, a magnetic tape drive, a compact disk drive, etc., where a copy of the program code for one or more of the processes depicted in FIGS. 4-5 may be stored. In addition, the processor(s) may communicate over a network, for instance, the Internet, LAN, etc., through a network adaptor.

Although described specifically throughout the entirety of the instant disclosure, representative embodiments of the present invention have utility over a wide range of applications, and the above discussion is not intended and should not be construed to be limiting, but is offered as an illustrative discussion of aspects of the invention.

Embodiments of the present invention provide a mechanism that detects when an equalizer has become unstable and clears, or resets, the equalizer so that user data passing may continue with minimal impact. Further, embodiments of this invention provide an approach to leverage a minor frequency change to achieve a reset of the equalizer. Because instability may lead to errors and dropped service, by resetting the equalizer and preventing the instability, embodiments of the invention result in a return to better operation in a timely fashion.

What has been described and illustrated herein are embodiments of the invention along with some of their variations. The terms, descriptions and figures used herein are set forth by way of illustration only and are not meant as limitations. Those skilled in the art will recognize that many variations are possible within the spirit and scope of the invention, wherein the invention is intended to be defined by the following claims—and their equivalents—in which all terms are meant in their broadest reasonable sense unless otherwise indicated.

What is claimed is:

1. A communications device for detecting instability resulting from non-linear impairments and resetting at least one equalizer of an end device, the communications device comprising:
    a data storage device configured to store an equalization instability threshold; and
    a processor configured
        to monitor an equalization parameter for the at least one equalizer of the end device,
        to determine whether the equalization parameter exceeds the equalization instability threshold, and
        in response to the equalization parameter exceeding the equalization instability threshold, to reset the equalizer, wherein the equalization instability threshold comprises one of a maximum power threshold for total power in all secondary equalizer taps and a predetermined percentage of secondary equalizer taps exceeding a maximum power threshold.

2. The communications device of claim 1, wherein the equalization parameter comprises one of an equalizing filter and an equalizing filter update.

3. The communications device of claim 1, wherein the processor is further configured:
    to perform a Data Over Cable Service Interface Specification (DOCSIS) load command to reset the equalizer.

4. The communications device of claim 1, wherein the processor is further configured:
    to command a frequency change of the equalizer, wherein the frequency change is within one of a same frequency band and a different frequency band, to reset the equalizer.

5. The communications device of claim 4, wherein the processor is configured:

to command the frequency change of equalizers in all end devices connected to the communications device using a primary channel.

6. The communications device of claim 5, wherein the processor is configured:
to command the frequency change of the equalizer in a particular end device using a secondary channel with an upstream channel descriptor (UCD), wherein the secondary channel is identical to the primary channel except for frequency.

7. The communications device of claim 4, wherein the processor is configured:
to determine whether the equalization parameter exceeds the equalization instability threshold for one of a particular end device and all end devices connected to the communications device;
in response to the equalization parameter exceeding the equalization instability threshold for all the end devices connected to the communications device,
to command the frequency change of the equalizer using a primary channel; and
in response to the equalization parameter exceeding the equalization instability threshold for the particular end device,
to command the frequency change of the equalizer using a secondary channel with an upstream channel descriptor (UCD).

8. The communications device of claim 1, wherein the processor is further configured:
to reschedule station maintenance messages for an immediate update of the end device.

9. A method for detecting instability resulting from nonlinear impairments and resetting at least one equalizer of an end device using a communications device, the method comprising:
retrieving an equalization instability threshold from a data storage device;
monitoring an equalization parameter for the end device; and
determining whether the equalization parameter exceeds the equalization instability threshold, and
in response to the equalization parameter exceeding the equalization instability threshold, resetting the equalizer, wherein the equalization instability threshold comprises one of a maximum power threshold for total power in all secondary equalizer taps and a predetermined percentage of secondary equalizer taps exceeding a maximum power threshold.

10. The method of claim 9, wherein monitoring the equalization parameter comprises:
monitoring the equalization parameter for all end devices connected to the communications device.

11. The method of claim 9, wherein monitoring the equalization parameter comprises one of receiving an equalizing filter from the at least one end device and determining an equalizer update.

12. The method of claim 9, wherein determining whether the equalization parameter exceeds the equalization instability threshold further comprises:
determining whether the equalization parameter exceeds the equalization instability threshold for all of the end devices or for a particular end device; and
in response to the equalization parameter exceeding the equalization instability threshold for all of the end devices, resetting the plurality of end devices, and
in response to the equalization parameter exceeding the equalization instability threshold for the particular end device, resetting the particular end device.

13. The method of claim 9 wherein resetting the equalizer comprises:
commanding a frequency change of the equalizer of the end device.

14. The method of claim 13, wherein resetting the equalizer further comprises
commanding the frequency change in of one a secondary channel with a UCD connected to a particular end device and a main channel connected to all the end devices.

15. The method of claim 13, further comprising:
rescheduling station maintenance messages for an immediate update of the end device.

16. A computer readable storage device storing at least one computer program that when executed by a computer system performs a method comprising:
retrieving an equalization instability threshold from a data storage device;
monitoring an equalization parameter for at least one end device; and
determining whether the equalization parameter exceeds the equalization instability threshold, and
in response to the equalization parameter exceeding the equalization instability threshold, resetting the equalizer, wherein the equalization instability threshold comprises one of a maximum power threshold for total power in all secondary equalizer taps and a predetermined percentage of secondary equalizer taps exceeding a maximum power threshold.

17. The method stored on the computer readable storage device of claim 16, wherein resetting the equalizer further comprises
commanding the frequency change in of one a secondary channel with a UCD connected to a particular end device and a main channel connected to all the end devices.

18. The method stored on the computer readable storage device of claim 16, wherein monitoring the equalization parameter comprises one of receiving an equalizing filter from the at least one end device and determining an equalizer update.

* * * * *